United States Patent

[11] 3,559,616

| [72] | Inventor | Donald E. Protzmann |
| | | Litchfield, Conn. |
| [21] | Appl. No. | 875,749 |
| [22] | Filed | Nov. 12, 1969 |
| [45] | Patented | Feb. 2, 1971 |
| [73] | Assignee | Lewis Engineering Company |
| | | Naugatuck, Conn. |
| | | a corporation of Connecticut |

[54] ILLUMINATED INSTRUMENT POINTER
7 Claims, 10 Drawing Figs.

[52] U.S. Cl. .................................................. 116/129, 240/2.1
[51] Int. Cl. .................................................. G09f 9/00
[50] Field of Search .................................................. 116/129, 133, 129E, 129L, 124; 240/1EI, 2.1, 8.16; 73/(Inquired); 324/(Inquired)

[56] References Cited
UNITED STATES PATENTS

| 2,286,737 | 6/1942 | Hills | 116/129 |
| 2,914,021 | 11/1959 | Blackwell et al. | 116/129 |
| 2,916,011 | 12/1959 | Molis | 240/2.1X |
| 3,143,098 | 8/1964 | Blackwell | 116/129 |
| 3,216,394 | 11/1965 | Blackwell | 116/129 |

Primary Examiner—Louis J. Capozi
Attorney—H. Gibner Lehmann

ABSTRACT: A pointer of light-conducting plastic comprising a shank portion from which there extends in opposite directions respectively a tail portion and a head portion aligned with the tail portion. The shank portion has prism surfaces by which light directed into it is redirected along the head and tail portions to illuminated aligned portions thereof. A translucent shield is disposed between the head and tail portions and covers the prism surfaces to be lighted by some of the light directed against the surfaces, whereby there is presented to view an uninterrupted, relatively great effective illuminated pointer length. In another embodiment of the invention the shield is opaque, whereby the viewer sees an interrupted pointer illumination.

PATENTED FEB 2 1971 3,559,616
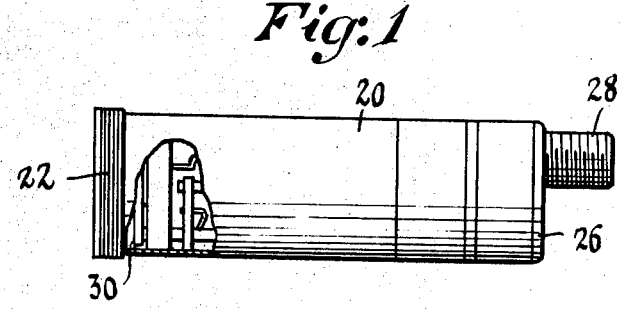
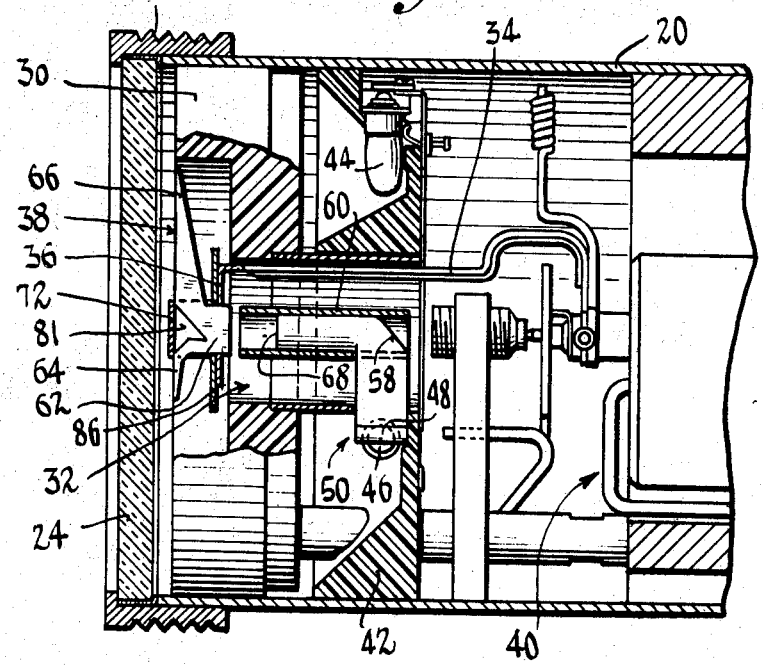
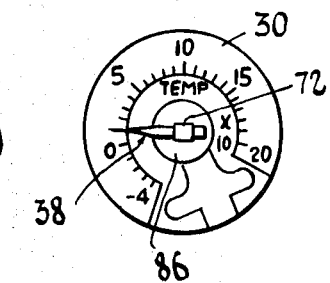
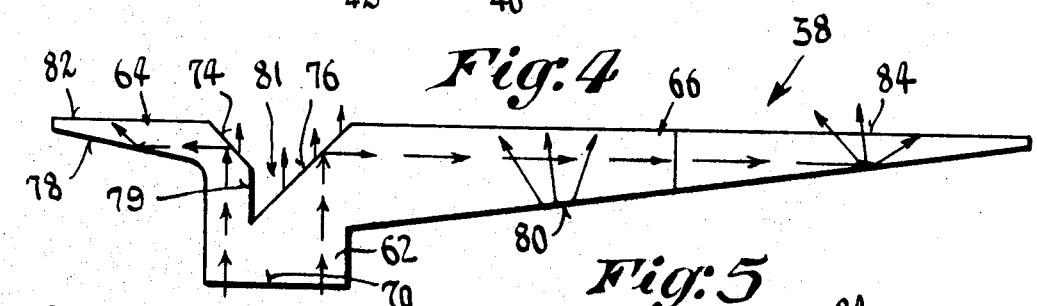
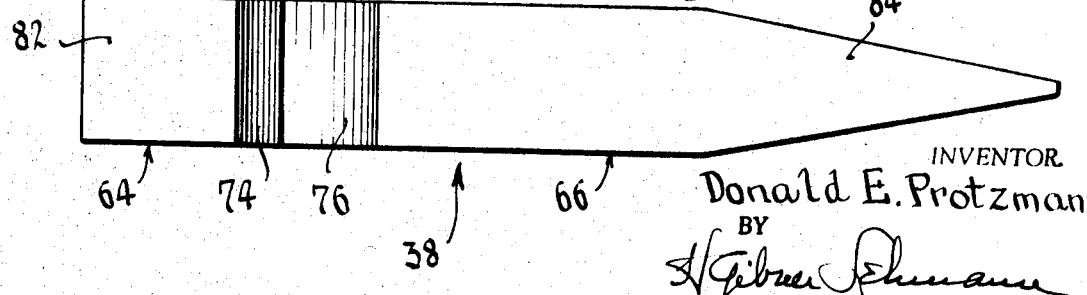
INVENTOR.
Donald E. Protzmann
BY
H. Gibner Lehmann
AGENT PATENTED FEB 2 1971 3,559,616
SHEET 2 OF 2
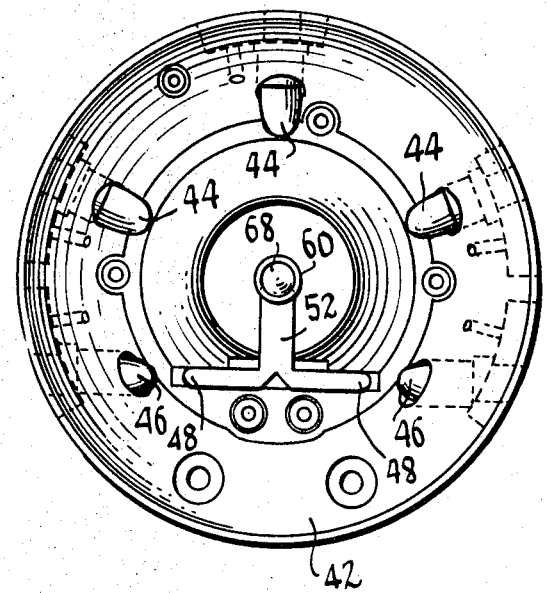
Fig. 6
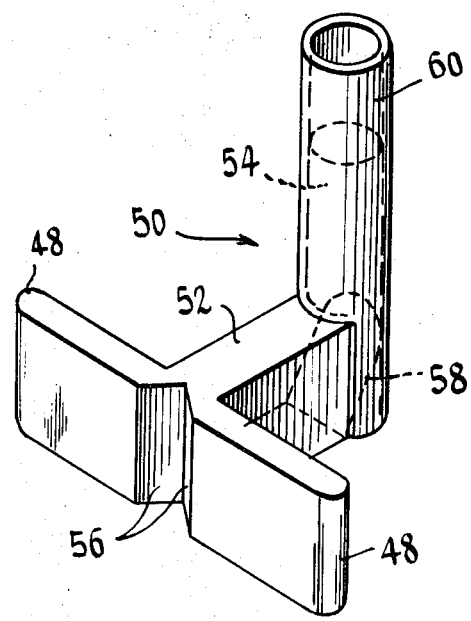
Fig. 7
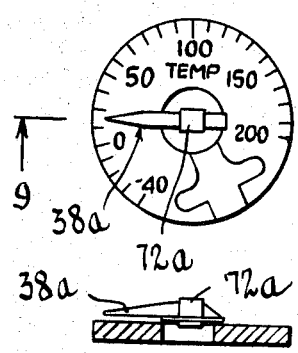
Fig. 8
Fig. 9
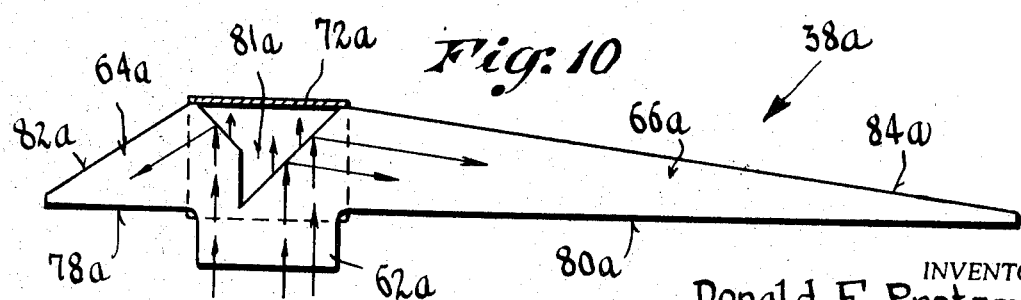
Fig. 10
INVENTOR
Donald E. Protzmann
BY
H. Gibson Lehmann
AGENT 3,559,616

ILLUMINATED INSTRUMENT POINTER

CROSS REFERENCES TO RELATED APPLICATIONS

1. U.S. Pat. No. 3,216,394 dated Nov. 9, 1965, entitled "Illuminated Indicating Instrument," Dana J. Blackwell, inventor; having common ownership with the present application.

2. Copending application of Dana J. Blackwell, Ser. No. 802,485 filed Feb. 26, 1969 and entitled "Illuminated Indicator Means and Instrument" and having common ownership with the present application.

BACKGROUND

This invention relates to illumination of instrument indicia, and more particularly to pointer illumination in electrical and other indicating instruments.

Heretofore, instrument pointers have been lighted along the length extending from the shank or axis portion to the pointer tip. Where instrument or dial sizes are reduced or miniaturized, the effective illuminated length of a pointer becomes so short as to make readings difficult, especially if the instrument or pointer axis is centrally disposed with respect to the dial or casing.

SUMMARY

The above disadvantages of prior miniature illuminated instruments is obviated by the present invention, one object forth, the provision of an improved illuminated instrument pointer which has an increased, relatively great illuminated length despite the small instrument size and centrally disposed pointer axis. This is accomplished by providing an illuminable tail portion on the pointer, aligned with and extending oppositely to the main or head portion, there being prisms carried by an intermediate or shank portion to redirect part of the light received thereby along said tail and head portions. A translucent shield disposed over the intermediate pointer portion receives another part of the light, arranged to have substantially the same intensity of illumination; this results in the viewer seeing an uninterrupted, relatively long illuminated length of pointer whereby the obtaining of instrument readings is greatly facilitated. In some cases it might be desired to have an interruption in the bar of light represented by the pointer. For such circumstance the shield can be of opaque material resulting in a break in the light bar.

Other features and objects reside in the provision of an improved illuminated pointer as above set forth, which is especially simple, operationally effective, constituted of few parts, rugged and reliable, and low in cost.

Still other advantages will hereinafter appear.

In the drawings:

FIG. 1 is a side elevational view, partly broken away, of a miniature indicating instrument embodying the invention.

FIG. 2 is a front elevational view of the pointer and dial of the instrument of FIG. 1.

FIG. 3 is a fragmentary axial sectional view, enlarged, of the front portion of the indicating instrument.

FIG. 4 is a side elevational view, enlarged, of the pointer of the instrument of FIG. 3.

FIG. 5 is a front elevational view of the pointer of FIG. 4.

FIG. 6 is a front elevational view of the lamp and light-directing assemblage of the instrument, as disposed behind the pointer and dial.

FIG. 7 is a perspective view of a light-piping member of the assemblage of FIG. 6.

FIG. 8 is a front elevational view of a pointer and dial constituting another embodiment of the invention.

FIG. 9 is a section taken on line 9—9 of FIG. 8.

FIG. 10 is a side elevational view, enlarged, of the pointer of FIGS. 8 and 9.

Considering first FIGS. 1—7 there is shown an instrument casing 20 having at its front a bezel 22 in which there is carried a transparent window 24. At its rear the casing 20 has a transverse wall 26 provided with a usual type of connector fitting 28 by which electrical connections are effected.

Behind the front window 24 there is mounted within the casing 20 a dial 30 having a central aperture 32 through which there extends a carrying arm 34 provided at its front end with a flat mounting annulus 36 in which a portion of the pointer 38 is held. The carrying arm 34 is mounted on an electrical instrument movement designated generally by the numeral 40.

Behind the dial 30 there is an annular lamp support and reflector member 42 mounting sets of incandescent lamps 44, 46. The lamps 46 are disposed adjacent lens-shaped end portions 48 of a light-piping member 50 having a central or body portion 52 and a cylindrical light exit portion 54. By means of prism surfaces 56 and 58, light from the lamps 46 which enters the extremities 48 will be reflected or redirected by means of the prism surfaces 56 and 58 so as to exit forwardly from the cylindrical portion 54. A tubular shield 60 surrounds the cylindrical portion 54 and extends closely adjacent a shank portion 62 of the pointer 38. By this organization, light from the set of lamps 46 is introduced, by means of the light-piping member 50, into the pointer shank portion 62, being directed in a forward direction. Further details of the above construction are given in the copending commonly owned application of Dana J. Blackwell, Ser. No. 802,485, filed Feb. 26, 1969 and entitled "Illuminated Indicator Means and Instrument."

In accordance with the present invention, the pointer 48 is so constituted as to present a relatively great illuminated length which is readily visible in spite of the relatively small size of the instrument movement and the dial and pointer thereof. Referring to FIGS. 4 and 5, the pointer 38 has an elongate tail portion 64 and a head portion 66 of appreciably greater length than the tail portion, said portions being aligned with each other and extending in opposite directions from the intermediate shank portion 62.

Within the front end of the tubular light shield 60, the cylindrical light exit portion 54 of the light-piping member 50 has a face 68 which is spaced to the rear of a flat surface 70 of the pointer shank portion 62. The intervening space between the surface 68, 70 is herein termed a "transfer point" since light leaving the surface 68 passes through said space or point and enters the shank portion 62.

According to the invention, both the head portion 66, tail portion 64 and intermediate portions of the pointer 38 can be fully illuminated whereby there is presented to the viewer a relatively long illuminated area of pointer having the appearance of a straight bar or line. Clipped over the shank portion 62 of the pointer is a U-section translucent light shield 72 which receives light that is passing out of the shank portion. The shield 72 is so constituted as to display substantially the same intensity of light as the head and tail portions of the pointer.

The shank portion 62 has prism surfaces 74 and 76 which divide the light beam received by the shank portion and redirect portions thereof respectively along the tail and head areas 64, 66 of the pointer. Arrows in FIG. 4 indicate the paths of such divided and redirected or reflected light beam. Further, the pointer 38 has light-colored coatings on the back surfaces 78 and 80 respectively of the tail and head portions 64, 66. Such coatings may, for example, be constituted of white paint or enamel, and as they receive the redirected light they become illuminated so as to be readily visible at the front of the pointer. The translucent properties of the shield 72 are chosen so that such shield exhibits the same lighting effect as the pointer portions. Thus there is presented to the viewer a relatively long, straight bar of light.

In accordance with the invention the hear portion 66 of the pointer is larger than the tail portion 64 and the prism surface 76 which acts to illuminate the head portion 66 is larger in area than the prism surface 74 which functions to illuminate the tail portion 64. The prism surfaces together with a third, axially extending surface 79 form a generally V-shaped notch 81 at the front of the pointer shank portion 62.

The pointer of FIGS. 4 and 5 has its front surfaces 82, 84 located in a common plane which is normal to the axis of the pointer, the rear surfaces 78, 80 being inclined with respect to the front surfaces whereby the head and tail portions 66, 64 taper to thin extremities.

The carrier arm 34 for the pointer 38 also has a light shield in the form of a disc 86 disposed at the rear of and extending around the shank portion 62. The disc 86 may be secured to the mounting annulus 36 of the arm 34, and these may be a press fit around the shank portion 62.

Another embodiment of the invention is illustrated in FIGS. 8—10. In these FIGS., a pointer 38a has a shank portion 62a, tail and head portions 64a, 66a respectively, and a front, generally V-shaped notch 81a in the shank portion 62a. An opaque light shield 72a is carried by the shank portion 62a. The tail and head portions 64a, 66a have rear surfaces 78a, 80a respectively which are disposed in a common plane. The top or front surfaces 82a, 84a of the tail and head portions are inclined with respect to the rear surfaces, and the said head and tail portions taper to thin extremities as with the pointer 38 illustrated in FIGS. 4 and 5. The rear surfaces 78a, 80a are coated with a light-colored paint, whereby the tail and head portions of the pointer are strongly illuminated and together appear as an interrupted straight line or bar, making reading of the instrument especially easy in spite of the small size.

It will now be understood from the foregoing that I have provided a novel and improved illuminated pointer construction for indicating instruments of small size, which facilitates the reading of the same in darkness, said pointer construction being especially simple, operationally effective, constituted of few parts, and being rugged, reliable and low in cost.

Variations and modifications are possible without departing from the spirit of the invention.

I claim:

1. Illuminated indicator means for an instrument, comprising in combination:
   a. a source of light;
   b. a light-piping member for conducting light from said source to a transfer point;
   c. a pointer of light-conducting plastic, having head and tail portions and a shank portion located intermediate said head and tail portions and adjacent said transfer point to receive light from the light-piping member;
   d. said shank portion having prism surfaces for dividing and redirecting light received by the shank portion along said head and tail portions respectively; and
   e. said head and tail portions having light-colored coatings on their undersides.

2. An illuminated indicator means as defined in claim 1, wherein:
   a. the head portion of the pointer has a greater length than the tail portion; and
   b. the prism surface which redirects light into the pointer head portion has a greater area than the prism surface which redirects light into the pointer tail portion.

3. An illuminated indicator as defined in claim 1, and further including: a translucent shield carried by the pointer, covering the shank portion and prism surfaces thereof.

4. An illuminated indicator means as defined in claim 1, and further including: an opaque shield carried by the pointer, covering the shank portion and prism surfaces thereof whereby the head and tail portions of the pointer together appear as an interrupted bar of light.

5. An illuminated indicator means as defined in claim 1, wherein:
   a. the head and tail portions of the pointer have front surfaces disposed in a common plane which is normal to the pointer axis;
   b. the rear surfaces of said head and tail portions being included with respect to said front surfaces; and
   c. said head and tail portions tapering to thin extremities.

6. An illuminated indicator means as defined in claim 1, wherein:
   a. the head and tail portions of the pointer have rear surfaces disposed in a common plane which is normal to the pointer axis;
   b. the front surfaces of said head and tail portions being inclined with respect to said front surfaces; and
   c. said head and tail portions tapering to thin extremities.

7. An illuminated indicator means as defined in claim 1, wherein: the front of the shank portion of the pointer has a generally V-shaped notch the walls of which comprise said prism surfaces.